April 3, 1962  L. S. VOTRE  3,027,862
MULTI-PURPOSE LAND AND WATER CRAFT
Filed Feb. 25, 1959   3 Sheets-Sheet 1
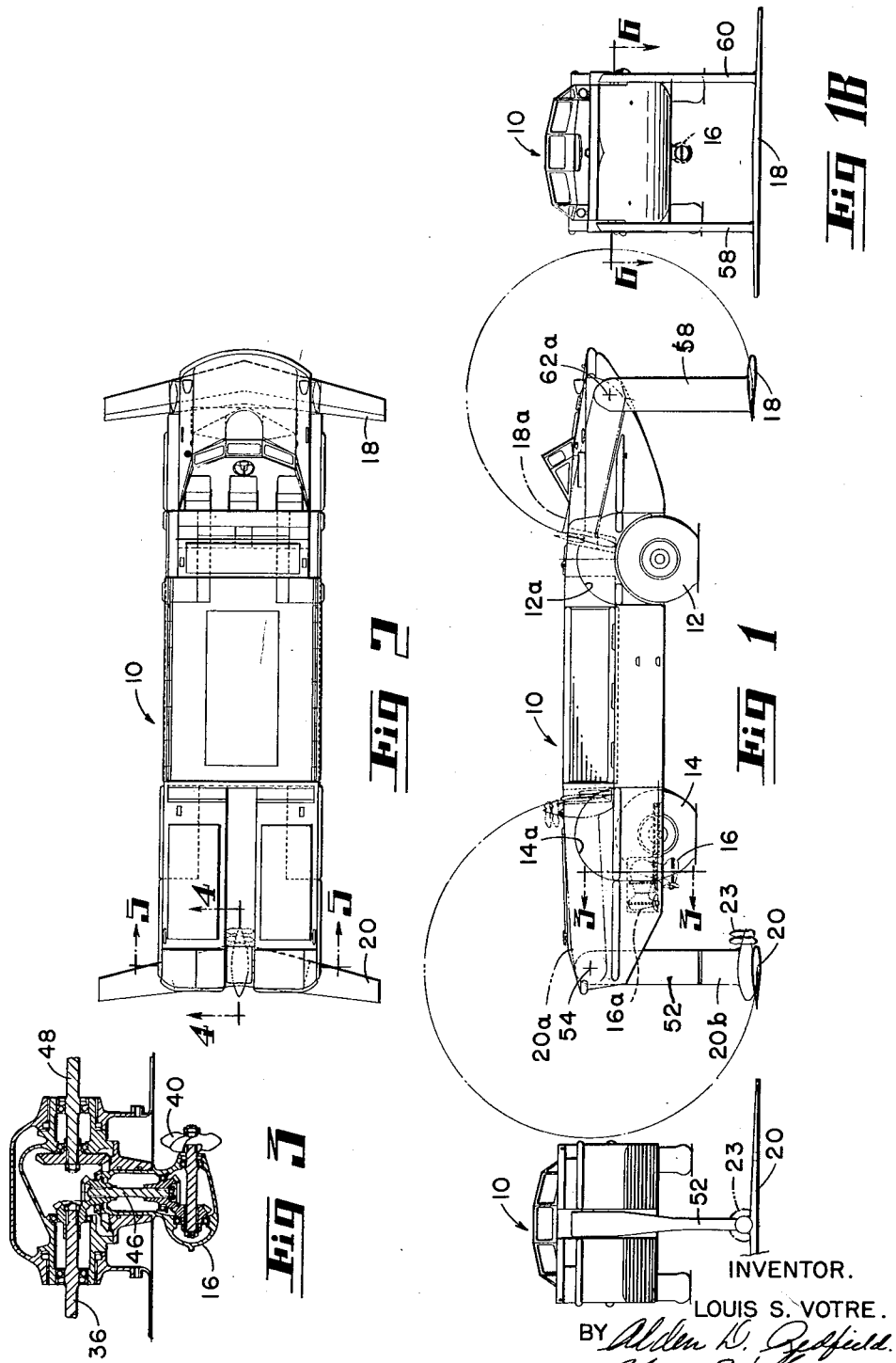
INVENTOR.
LOUIS S. VOTRE.
BY
ATTORNEYS.

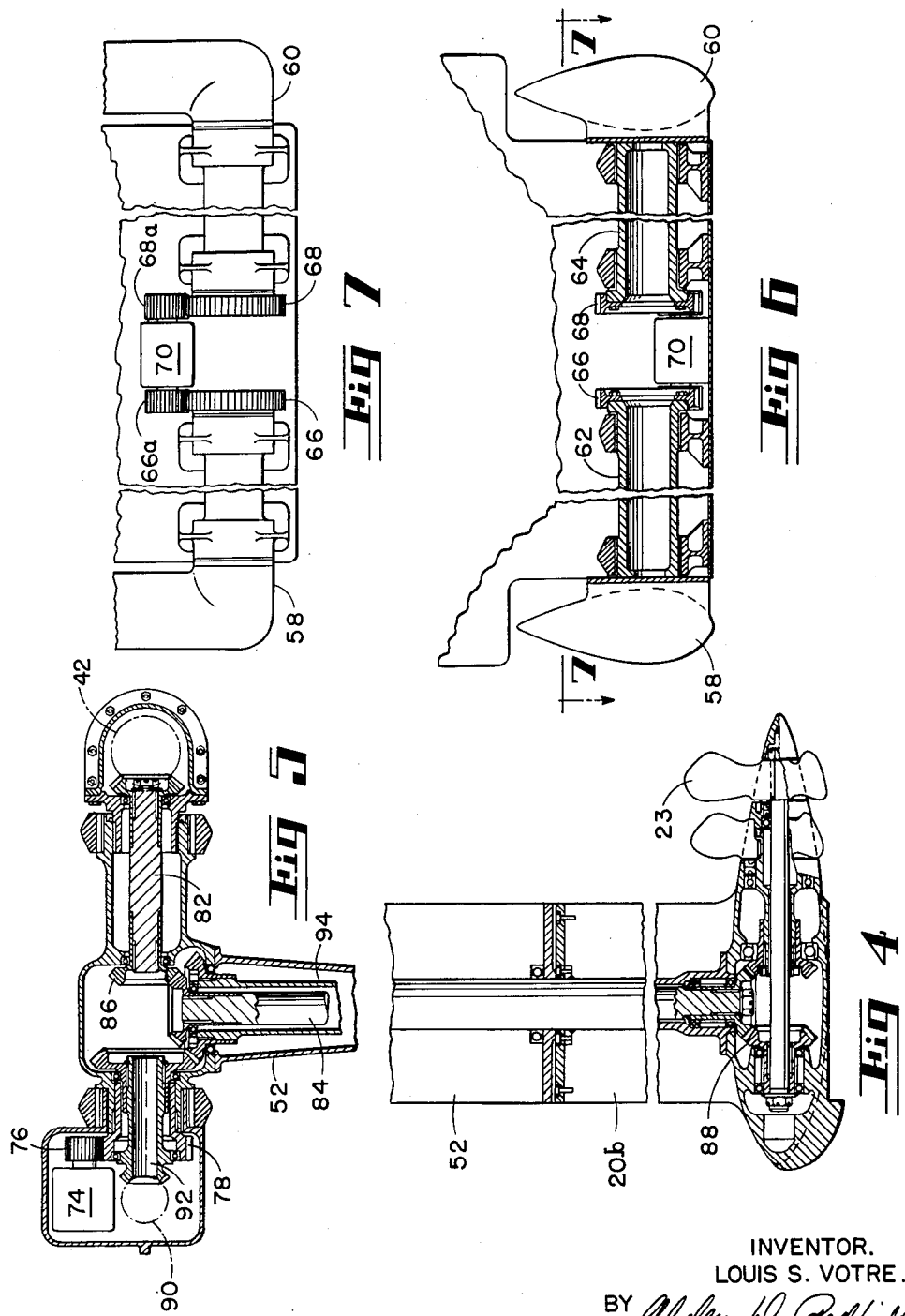

April 3, 1962 L. S. VOTRE 3,027,862
MULTI-PURPOSE LAND AND WATER CRAFT
Filed Feb. 25, 1959 3 Sheets-Sheet 3
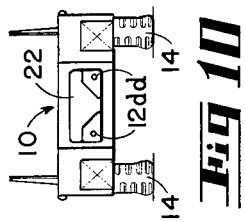
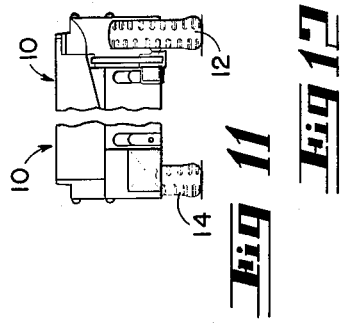
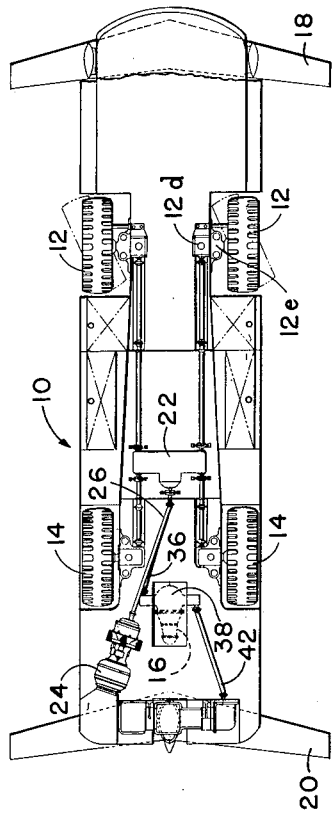
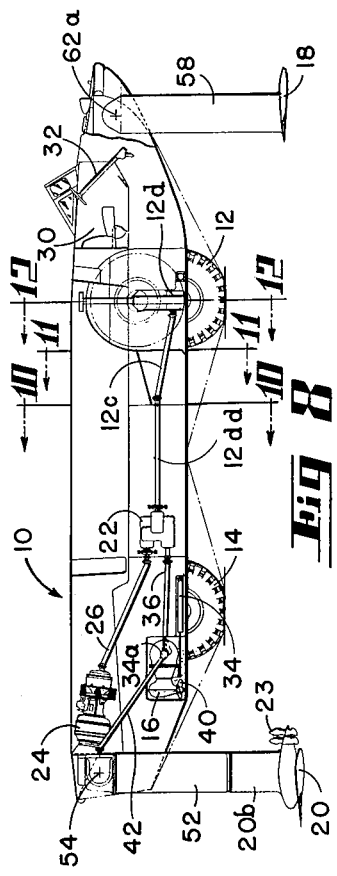
INVENTOR.
LOUIS S. VOTRE.
BY
ATTORNEYS.

United States Patent Office 3,027,862
Patented Apr. 3, 1962

3,027,862
MULTI-PURPOSE LAND AND WATER CRAFT
Louis S. Votre, Fairfield, Conn., assignor to Avco Manufacturing Corporation, Lycoming Division, Stratford, Conn., a corporation of Delaware
Filed Feb. 25, 1959, Ser. No. 792,693
5 Claims. (Cl. 115—1)

This invention relates to a craft capable of navigation on either land or water, including the additional ability to operate on water either as a buoyant displacement type craft or as a craft supported above water by the lift of a hydrofoil. In certain applications for transport (military operations being one example), it is important to have a vehicle capable of operation both on land and water. It is, however, desirable that a craft of this type be capable of increased speed over the water at certain times beyond that afforded by a displacement vessel, and the conversion of such a craft into a hydrofoil type craft with suitable mechanism for movement of hydrofoils from a storage position into action effectively is a conversion which has major utility.

Added to these two possibilities is the further necessity to take such a craft out of the water onto a beach and to provide quick conversion of such craft to a land-wheeled vehicle with driving and steering means, and in such transition, the necessity to move all of the water propelling apparatus, including hydrofoils, to an inactive storage position which will not interfere with movement out of the water in very shallow water conditions, as well as to bring the wheels into active operating position from a storage position where they have not interfered with the operation of the vehicle as a boat or hydrofoil unit.

The accomplishment of the above purposes in a so-called triple function vehicle with a common power plant for all three functions, that is land vehicle, boat, hydrofoil, together with mechanism capable of retracting the driving and retracting units for all three of such functions into both retracted and operating positions selectively at the will of the operator, using duplicated and unitary control mechanisms where possible and including the method and arrangement for satisfactory retraction and positioning of the parts for the various functions, constitute important objects of the present invention.

It is a further object to provide retracting mechanism for a hydrofoil unit employing downwardly extending struts near the forward and aft ends of the hull of a craft for supporting hydrofoils, with such struts mounted for arcuate swinging movement around their respective ends of the hull, from operating position below the hull to a storage position in the upper portion of the hull.

The above and other objects of the invention will appear more fully from the following more detailed description and by reference to the accompanying drawings forming a part hereof, and wherein:

FIGURE 1 is a side view of the multi-purpose land and water craft of this invention showing wheels, boating drive and hydrofoil support and drive.

FIGURE 1A is a rear end view of FIGURE 1.

FIGURE 1B is a front end view of FIGURE 1.

FIGURE 2 is a top view of the drawing of FIGURE 1.

FIGURE 3 is a section on the line 3—3 of FIGURE 1 and is a section through the boating drive mechanism.

FIGURE 4 is a section on the line 4—4 of FIGURE 2 through the hydrofoil drive mechanism.

FIGURE 5 is a section on line 5—5 of FIGURE 2, and is a section through the hydrofoil drive and retraction mechanism.

FIGURE 6 is a section on the line 6—6 of FIGURE 1B and shows the front hydrofoil retracting mechanism.

FIGURE 7 is a further showing of the front hydrofoil retraction mechanism and is taken on the line 7—7 of FIGURE 6.

FIGURE 8 is a side view showing the gas turbine drive gear mechanism and certain of the drive and retraction mechanism to the several units.

FIGURE 9 is a top view of the mechanism in FIGURE 8 and also shows the gas turbine and drive connections as well as retracting mechanism.

FIGURE 10 is a section on the line 10—10 of FIGURE 8.

FIGURE 11 is a section on the line 11—11 of FIGURE 8.

FIGURE 12 is a section on the line 12—12 of FIGURE 8.

General Arrangement

Referring to FIGURES 1, 1A, 1B and 2:

The general arrangement of the multi-purpose land and water craft is shown, with a hull 10 being so constructed as to be water-tight and serving the general purpose of a boat capable of floating the load carried therein. This boat hull is fitted with four land wheels, a pair of steerable front wheels 12 and a pair of rear wheels 14, both pairs of wheels being retractable from the land drive position shown in FIGURE 1 to a retracted inside-the-hull position indicated by wheel receptacles 12a and 14a, respectively. The mechanism for such change of position is later described, as well as the drive for driving the vehicle as a land craft.

For the purpose of driving the unit as a conventional displacement water craft, so-called boating drive 16 is provided in the rear of the vehicle. This boating drive is retractable to a position 16a, position 16 shown in FIGURE 1 being the position for boating actuation. The mechanism in the position 16 is also provided with means to steer the vehicle by turning the unit 16 on a vertical axis. The drive for retraction, propeller drive, and steering will be later described.

A third means of drive is the so-called hydrofoil drive which enables the boat to be actuated as a hydrofoil unit, the lift of front hydrofoil 18 and rear hydrofoil 20 being made available by a propeller drive unit 23 attached to the center portion of the rear hydrofoil. The hydrofoil unit, that is both the front and rear hydrofoil units, are retractable from their actuation position shown in FIGURE 1 to the dotted-line positions shown in FIGURE 1. The dotted line position of the front hydrofoil is shown at 18a in FIGURE 1, and the dotted-line position of the rear hydrofoil unit is shown at 20a in FIGURE 1. The front and rear hydrofoils are swung in an arc around their respective ends of the hull 10 from the actuating position shown at 18, 20 in FIGURE 1 to the stored positions in the upper part of the craft as shown.

It is also possible by mechanism later to be described to move the hydrofoils in a limited amount so that the mechanism used for moving the hydrofoils to the stored position is also operable in lesser amount, that is in small increments of movement, to change the angle of attack of the hydrofoils relative to the direction of movement through the water, and this combined mechanism is a part of the mechanism later to be described. It is also a function of the hydrofoil unit to provide a steering of the craft under hydrofoil conditions by axial movement of a section 20b of the rear hydrofoil support.

Therefore, it appears that the general arrangement of the three drives all afford means to extend their respective mechanism to actuating drive positions and also to retract the mechanism into inactive positions. These mechanisms are selective and may be simultaneously or selectively actuated. Also, in the case of all three units, a means to steer the craft is provided. In the case of the hydrofoil drive, there is additional control for changing the angle of attack of the hydrofoil sections themselves to change the lifting effectiveness of the hydrofoils by a small increment movement of the same mechanism that is used for storing the hydrofoil units.

Land Craft

Referring particularly to FIGURES 8, 9, 10, 11 and 12, as well as to the general arrangement of FIGURE 1:

The front wheel pairs 12—12 and the rear wheel pairs 14—14 are each mounted for retraction into wheel wells as shown in the dotted line in FIGURE 8, where it appears that the wheel propeller shaft 12c is mounted to swing in an arc to allow the individual wheel gear box 12d to move vertically with the wheel to the dotted line position as shown in FIGURE 8. The gear box propeller shaft 12c is connected with the propeller shaft 12cc to the central gear box 22. Each of the wheels has a similar mounting affording a propeller drive shaft connection to the main gear box, as will be evident on inspection of the top view of FIGURE 9. The main gear box is driven from the power plant 24, here shown as a gas turbine engine, through the main drive shaft 26 to the gear box 22. Each of the wheels is individually suspended for extension and retraction by a hydraulic strut member 12e shown in FIGURE 8, which hydraulic strut is a mechanism well-known in the art and is actuated by a hydraulic system providing fluid under pressure for all of the hydraulic operated systems in the craft and for the purpose of retracting and extending the wheels is reproduced on all four wheels by mechanism similar to that shown in FIGURE 8 for the front wheel 12.

It is therefore apparent that the power plant 24 driving the gear box 22, which is provided with suitable gear train mechanism, is operable to cause the front wheels 12 and the rear wheels 14 to be driven for land operation from the power plant 24 at the will of the operator in the cockpit 30 by suitable controls not shown.

In addition, each of the wheels is extended or retracted by actuation of suitable controls also in the cockpit 30 for causing the hydraulic mechanism to extend or retract the member 12e on each wheel. Steering mechanism for the front wheel 12 is also carried to the steering wheel 32 by suitable connections. Thus, it appears that the wheels are provided with power for four-wheel drive when extended into the land-drive position and are provided with means to retract the wheels and to steer the wheels, thereby to afford a land craft control and drive of the vehicle for land operation. At such times the boating drive 16 and the hydrofoil units 18, 20 are both normally in the stored-away or dotted-line position shown in FIGURE 1, although the boating drive 16 may be desired for simultaneous use with the wheel drive for pulling the craft from the water, as will be later described.

Boating

For operation of the craft as a displacement type buoyant boat, the boating drive 16 is provided. This drive is shown in FIGURES 1, 3, 8 and 9, and is shown in its drive position in FIGURE 1 in the solid line, and in the dotted-line position 16a of FIGURE 1 it is in the retracted position. It is also shown in the retracted position in FIGURE 8. The unit 16 is swung from a retracted to an operable position by a hydraulic strut member 34 actuated by the hydraulic system of the craft previously described, and this entire unit 16, being pivoted about an axis 34a, swings from the recessed chamber 34b in the hull by the actuation of the strut 34.

As shown by the top view of FIGURE 9 and the side view of FIGURE 8, the drive shaft 36 from the main gear box 22 extends to a gear box 38 on the unit 16, which includes gearing provided for either driving the boating propeller 40 by selective operation of gearing within the gear box or to selectively actuate a gearing within the gear box 38 to drive a hydrofoil propelling shaft 42, later to be described.

It is sufficient to state, for the boating drive, however, that there is a selective clutch mechanism in the gear box 38 to selectively actuate either the boating propeller 40 and/or the hydrofoil shaft 42. The drive coming from the main gear box 22 is of course driven by the power plant 24 through the shaft 26 as previously mentioned.

Referring to FIGURE 3, which is a cross-section of the boating drive unit 16, the boating propeller 40 is driven through the shafts 36, 46 as previously mentioned, thereby affording propeller drive to give a propelling thrust to the boating unit in the water, while the shaft 48 is connected with the previously mentioned steering mechanism 32 in the cockpit 30 to turn the boating drive propeller unit 40 about the vertical axis of the shaft 46 so that the boat may be steered by a conventional steering wheel 32 acting on the shaft 48.

Thus it appears that the boating drive has three control units capable of selective operation, the retracting and extending mechanism in the hydraulic cylinder 34 which selectively positions the unit either in boating or retracted positions described, such being actuated from the hydraulic system by suitable manual controls in the cockpit 30; the further mechanism for drive of the propeller 40 to propel the unit as a boat coming through the drive shaft 36 from the main power 24 through the gear box 22, this also being selectively actuated by suitable clutch mechanism to actuate the gearing in the gear box 38; and further steering mechanism above described which is connected to the steering wheel 32 and through the shaft 48 to steer the boat by angular movement of the lower projecting supporting unit for propeller 40 by movement of this unit about the axis of the shaft 46.

Hydrofoils

It has been previously mentioned that the front and rear hydrofoil planes 18, 20 are movable in an arc around the ends of the hull from an actuating position in which they are shown in FIGURE 1 to the dotted-line storage position in the upper part of the craft in which they are also shown in FIGURE 1 through the arc approximately 260° movement in the rear and 256° arc in the front. The rear hydrofoil 20 in the mechanism here disclosed has a single vertical strut 52 which is pivoted on an axis 54 extending cross-wise at the rear of the vehicle, while the front hydrofoil 18 is supported on two struts 58, 60, both of which are pivoted to swing about an axis 62 in the arc shown in FIGURE 1. Although the arc of movement shown in FIGURE 1 in the two positions, one the solid-line and the other the dotted-line, is for positions of movement from general operable position to storage position, it will be possible by mechanism hereinafter disclosed to move both the members 18, 20 a small increment of their arc path to afford a change in the angle of attack of the hydrofoils relative to the water, thus affording both a storage movement or angle adjustment by this same mechanism.

Referring to FIGURES 6 and 7, there is shown the mechanism for actuating the front hydrofoil 18 by swinging the struts 58, 60 in an arcuate path as shown in FIGURE 1. This mechanism comprises shafts 62, 64, which extend across the front of the craft and their axes coincide with the axis 62a previously mentioned.

The inner ends of the shafts 62, 64 are provided with gears 66, 68 and by meshing gearing 66a, 68a driven by hydraulic motor 70 which is actuated from the cockpit by the controls for the hydraulic system previously mentioned. Therefore, by actuation of the motor 70, which is reversible at the will of the operator in the cockpit, it is possible to actuate the motor 70 to swing the struts 58, 60 in either direction in an arcuate path and thereby to move the hydrofoils 18, 20 from their stored position to active position, or vice versa, or with hydrofoils downward in their operating position it is possible to actuate the motor 70 in a limited movement to change the angle of the plane 18 as previously mentioned.

The rear hydrofoil 20 also has mechanism for swinging the strut 52 in an arc about the axis 54. This mechanism is shown in FIGURE 5, where it appears that there is a hydraulic motor 74 driving gearing 76 through shaft 78, which shaft is connected with the strut 52, and this actuation provides for swinging movement of the strut 52 from downward hydrofoil actuated position to storage position, with limited movement for changing angle of attack near operating position.

There is also provided a connection previously mentioned for the drive shaft 42 to rotate the shaft 82, which drives the central shaft 84 extending downwardly through the strut 52 through the gearing 86 at the top and the bevel gear 88 at the bottom to cause rotation of the propeller units 23, the steering of the craft when in the hydrofoil operating position being accomplished through a connection 90 which drives through a shaft 92, 94 downwardly to connect with the lower section 20b of the strut 52 which is mounted to swing on the vertical axis of the strut to accomplish a steering action. The hydraulic motor 74 for moving the strut for angle of attack adjustment and for storage is actuated from the hydraulic system and selectively controlled from the cockpit by suitable manual controls. It is thus possible by controls herein mentioned to selectively rotate the propellers; swing the strut for adjustment of angle and storage of the rear hydrofoil unit, as well as to steer the craft while in hydrofoil planing operation, thus completing the control of both the front and rear hydrofoils for the operation of the unit as a hydrofoil operated craft when desired.

*Operation*

It is believed that the operation of the vehicle has been quite completely described with the description of the several units, but it is to be emphasized that with the mechanisms herein disclosed, which are either selectively or simultaneously operated by manual control from the cockpit by the operator of the craft, that it is possible to actuate controls to simultaneously put in operation the wheel drive and the boating drive, for instance, so that it will be possible when moving the craft out of the water to cause the wheels to be lowered and to begin operation while the boating drive 16 is still operating, thus affording for a limited period, if so desired, the thrust of both the wheels and the boating drive near the shore—that is, have wheel traction when the wheels touch bottom while boating drive is still operating—thereby giving double thrust of both the wheels and the boating drive, the boating drive, however, being kept out of the way from contact with the beach because of the fact it is always above the wheels affording a thrust as long as the boating propeller is in the water, and thus both thrusts are available at the will of the operator for removing the boat from the water.

It is also an important feature of this mechanism that the hydrofoil units are positioned near the front and rear end of the hull and have means for storage of the hydrofoil units by the arcuate swinging of the hydrofoils from their downward position outwardly and around the respective ends of the hull and down into the recesses front and rear in the top portion of the craft. Therefore, when the hydrofoils are so stored away they are in a part of the hull away from the bottom of the boat so that they are not subject to interference with the operation of the unit as a land vehicle or as a boat drive displacement craft in shallow water. However, when the boat reaches a depth which is sufficient so that hydrofoil operation can be begun, the hydrofoils can then be swung into position by again swinging them around the ends of the hull with the boating drive still in operation and the planing of the boat started with both the hydrofoil propeller and the boating drive propeller both operating until the lift of the hydrofoil unit is sufficient to lift the boat out of the water and to lift the boating drive clear of the water, at which time the boating drive can be shut off and retracted into the hull.

Although the invention has been described by reference to a specific structure, it is intended that various modifications may be made without departing from the fundamental principles herein disclosed, and it is intended that such variations may be made within the scope of the following claims:

I claim:

1. In a multi-purpose land and water craft having a hull and forward and after hydrofoil means downwardly extending from and rotatably movable with respect to said hull, the improvement comprising the combination of: fore and aft receptacle means in said hull for reception of said respective forward and after hydrofoil means, means to swing said hydrofoil means from said downwardly extending positions in an arc around the ends of said hull to position said hydrofoil means in said respective receptacles, said hydrofoil swinging means having means enabling incremental adjustment of the angle of attack of said hydrofoils in said downward position, said hull having a wheel drive means, a boating drive means, and a propeller drive means on at least one of said hydrofoil means, means to selectively actuate each of said drive means, whereby said wheel and boating drive means may be simultaneously actuated in shallow water to obtain combined forward thrust from said wheels and said boating drive means, and whereby said hydrofoil propeller drive means and said boating drive means when positioned for operation may be simultaneously actuated to assist the transition from boating drive to hydrofoil operation.

2. In a multi-purpose land and water craft having a hull and forward and after hydrofoil means downwardly extending from and rotatably movable with respect to said hull, the improvement comprising the combination of: fore and aft receptacle means in said hull for said respective forward and after hydrofoil means, said receptacle means being substantially above the water level of said hull when said craft is operated as a displacement vessel, means to swing said hydrofoil means from said downwardly extending positions in an arc around the ends of said hull to position said hydrofoil means in said respective receptacles, said hydrofoil swinging means being adapted for incremental adjustment of the angle of attack of said hydrofoils in said downward position, said hull having a wheel drive means, a boating drive means, and a propeller drive means on at least one of said hydrofoil means, means to actuate each of said drive means including means to selectively and simultaneously actuate said wheel and boating drive means, whereby said wheel and boating drive means may be simultaneously actuated in shallow water to obtain combined forward thrust from said wheels and said boating drive means, and whereby said hydrofoil propeller drive means and said boating drive means when positioned for operation may be simultaneously actuated to assist the transition from boating drive to hydrofoil operation.

3. In a multi-purpose land and water craft having a hull and forward and after hydrofoil means downwardly extending from and rotatably movable with respect to said hull, the improvement comprising the combination of: fore and aft receptacle means in said hull for said respective forward and after hydrofoil means, said receptacle means being substantially above the water level of said hull when said craft is operated as a displacement vessel, means to swing both of said hydrofoil means from said downwardly extending positions in an arc around the ends of said hull to position said hydrofoil means in said respective receptacles, said swinging means for said after hydrofoil comprising a single strut positioned centrally with respect to said hull, said hydrofoil swinging means being adapted for incremental adjustment of the angle of attack of said hydrofoils in said downward position, said hull having a wheel drive means, a boating drive means, and a propeller drive means on at least one of said hydrofoil means, means to actuate each of said drive means including means to selectively and simultaneously actuate said wheel and boating drive means, whereby said wheel and boating drive means may be simultaneously actuated in shallow water to obtain combined forward thrust from said wheels and said boating drive means, and whereby said hydrofoil propeller drive means and said boating drive means when positioned for operation may be simultaneously actuated to assist the transition from boating drive to hydrofoil operation and a steering means for said hull during actuation of said propeller drive means, said steering means comprising means to deviate said strut angularly with respect to the longitudinal axis of said hull.

4. In a multi-purpose land and water craft having a hull and forward and after hydrofoil means downwardly extending from and rotatably movable with respect to said hull, the improvement comprising the combination of: wheels upon said hull for ground operation, mechanism for extending and retracting said wheels, fore and aft receptacle means in said hull for said respective forward and after hydrofoil means, said receptacle means being substantially above the water level of said hull when said craft is operated as a displacement vessel, means to swing said hydrofoil means from said downwardly extending positions in an arc around the ends of said hull to position said hydrofoil means in said respective receptacles, said hydrofoil swinging means being adapted for incremental adjustment of the angle of attack of said hydrofoils in said downward position, said hull having a wheel drive means, a boating drive means, and a propeller drive means on at least one of said hydrofoil means, said boating drive means including a propeller mounted to extend into operating position below said hull but at a position above the lowermost extension of said wheels and said hydrofoil means, operating means to extend and retract said mechanism to selectively put said boating drive means in operative position with said wheels in either retracted or extended position, and means to actuate each of said drive means, whereby said wheel and boating drive means may be simultaneously actuated in shallow water to obtain combined forward thrust from said wheels and said boating drive means, and whereby said hydrofoil propeller drive means and said boating drive means when positioned for operation may be simultaneously actuated to assist the transition from boating drive to hydrofoil operation.

5. The improvement as defined in claim 4 wherein the wheel, boating, and propeller drive means are all powered by a common power.

References Cited in the file of this patent
UNITED STATES PATENTS

| | | |
|---|---|---|
| 2,708,894 | Hook | May 24, 1955 |
| 2,749,870 | Vavra | June 12, 1956 |
| 2,908,241 | Todd | Oct. 13, 1959 |